United States Patent
Negulescu (10) Patent No.: US 9,151,501 B2
(45) Date of Patent: Oct. 6, 2015

(54) GAS TURBINE CENTRIPETAL ANNULAR COMBUSTION CHAMBER AND METHOD FOR FLOW GUIDANCE

(75) Inventor: Dimitrie Negulescu, Berlin (DE)

(73) Assignee: Rolls-Royce Deutschland Ltd & Co KG (DE)

(*) Notice: Subject to any disclaimer, the term of this patent is extended or adjusted under 35 U.S.C. 154(b) by 0 days.

(21) Appl. No.: 14/232,814

(22) PCT Filed: Jun. 14, 2012

(86) PCT No.: PCT/EP2012/002518
§ 371 (c)(1),
(2), (4) Date: Jan. 14, 2014

(87) PCT Pub. No.: WO2013/013740
PCT Pub. Date: Jan. 31, 2013

(65) Prior Publication Data
US 2014/0150442 A1 Jun. 5, 2014

(30) Foreign Application Priority Data
Jul. 28, 2011 (DE) .................. 10 2011 108 887

(51) Int. Cl.
*F23R 3/10* (2006.01)
*F02C 3/14* (2006.01)
(Continued)

(52) U.S. Cl.
CPC ... *F23R 3/10* (2013.01); *F02C 3/08* (2013.01); *F02C 3/14* (2013.01); *F23R 3/52* (2013.01); *F05D 2240/36* (2013.01); *F05D 2250/314* (2013.01); *Y02T 50/671* (2013.01)

(58) Field of Classification Search
CPC .......... F02C 3/08; F02C 3/14; F05D 2240/36; F05D 2250/314; F23R 3/52; F23R 3/10; Y02T 50/671; F02D 2210/42; F02D 2210/43
USPC ............ 60/726, 751, 752; 415/115, 144, 145; 416/95, 96 R
See application file for complete search history.

(56) References Cited

U.S. PATENT DOCUMENTS 3,000,183 A  9/1961 Hall
3,608,310 A  9/1971 Vaught
(Continued)

FOREIGN PATENT DOCUMENTS

BE  674852   1/1966
CH  214256   4/1941
(Continued)

OTHER PUBLICATIONS

Jan. 28, 2014 English Translation of Written Opinion of International Search Report dated Nov. 6, 2013 from counterpart Application No. PCT/EP2012/002518.
(Continued)

*Primary Examiner* — Phutthiwat Wongwian
*Assistant Examiner* — Carlos A Rivera
(74) *Attorney, Agent, or Firm* — Timothy J. Klima; Shuttleworth & Ingersoll, PLC (57) ABSTRACT

A gas-turbine combustion chamber arrangement includes at least one centrifugal compressor as well as one centripetal annular combustion chamber, with a stator vane arrangement being provided between the centrifugal compressor and the annular combustion chamber. The stator vane arrangement for diverting the air flowing out of the centrifugal compressor is designed at an angle α of 20° to 30°, preferably 25°, relative to the engine axis, so the airflow is passed at essentially this angle α to the combustion chamber. The inflow area into the combustion chamber for supplying air is designed at an angle of 20° to 30°, preferably 25°, relative to the meridional plane, and the center axes of the burners or of the injection nozzles of the combustion chamber are arranged inclined at an angle β of 30° to 40°, preferably 35°, relative to a meridional plane passing through the engine axis.

12 Claims, 5 Drawing Sheets

(51) Int. Cl.
*F02C 3/08* (2006.01)
*F23R 3/52* (2006.01)

(56) References Cited

U.S. PATENT DOCUMENTS

| | | | |
|---|---|---|---|
| 5,220,795 A | 6/1993 | Dodds et al. | |
| 5,241,818 A | 9/1993 | Shekleton et al. | |
| 5,839,283 A | 11/1998 | Doebbeling | |
| 6,192,669 B1 | 2/2001 | Keller et al. | |
| 6,279,322 B1 * | 8/2001 | Moussa | 60/751 |
| 6,488,469 B1 * | 12/2002 | Youssef et al. | 415/143 |
| 7,549,294 B2 | 6/2009 | Buret et al. | |
| 7,716,931 B2 * | 5/2010 | Mancini et al. | 60/748 |
| 7,954,327 B2 | 6/2011 | Pieussergues et al. | |
| 2007/0012048 A1 | 1/2007 | Buret et al. | |
| 2008/0134661 A1 * | 6/2008 | Pieussergues et al. | 60/39.83 |

FOREIGN PATENT DOCUMENTS

| | | |
|---|---|---|
| DE | 19541303 | 5/1997 |
| DE | 19549143 | 7/1997 |
| EP | 0870990 | 10/1998 |
| EP | 1746348 | 1/2007 |
| EP | 1830129 | 9/2007 |
| FR | 2909748 | 6/2008 |
| WO | 9956059 | 11/1999 |
| WO | 2007 102807 | 9/2007 |

OTHER PUBLICATIONS

German Search Report dated May 15, 2012 from counterpart German Patent Application No. 10 2011 108 887.7.

International Search Report dated Nov. 6, 2013 from counterpart International Application No. PCT/EP2012/002518.

English Translation of International Search Report and Written Opinion dated Jan. 3, 2013 from related PCT Application No. PCT/EP2011/002959.

International Search Report dated Aug. 12, 2011 from related PCT Application No. PCT/EP2011/002959.

German Search Report dated Jun. 6, 2011 from related German Application No. DE 10 2010 023 816.3.

* cited by examiner

GAS TURBINE CENTRIPETAL ANNULAR COMBUSTION CHAMBER AND METHOD FOR FLOW GUIDANCE

This application is the National Phase of International Application PCT/EP2012/002518 filed Jun. 14, 2012 which designated the U.S.

This application claims priority to German Patent Application No. DE102011108887.7 filed Jul. 28, 2011, which application is incorporated by reference herein.

This invention relates to a gas-turbine combustion chamber arrangement with at least one centrifugal compressor as well as one centripetal annular combustion chamber.

Gas turbines are known from the state of the art that use a centrifugal compressor through which the airflow is guided outwards in the radial direction. Centrifugal compressors of this type are coupled to a centripetal annular combustion chamber or to a reverse-flow combustion chamber, in which the airflow is diverted and guided inwards in the direction of an engine axis before being passed to an axially operating turbine.

In detail, these are aircraft gas-turbine drives which have as their single or last compressor stage a radial or a diagonal compressor stage, also termed centrifugal compressor stage. The outlet velocity from the centrifugal compressor rotor wheel usually reaches a Mach number of approx. 0.8. For this reason, a multi-stage and radially/axially designed stator vane system (stator vanes) is provided downstream of the centrifugal compressor rotor wheel in the state of the art, and is used to decelerate the flow to a Mach number of approx. 0.15 and to divert the flow in the axial direction, before the flow is deflected to an annular space of the combustion chamber underneath a combustion chamber casing (flow surge). After the flow surge, part of the compressor air is, according to the state of the art, passed radially inwards to the injection nozzles in the primary space of a flame tube. In this regard, the state of the art shows both reverse flame tubes and centripetal flame tubes. The remaining air flowing out of the centrifugal compressor is passed through annular spaces around the flame tube to an array of recesses (mixing holes) in the flame tube. Downstream of each burner, the flame stabilizes, with the flame axis facing inwards in a meridional plane (the plane through the engine axis). The combustion chamber flow is substantially swirl-free both at the inlet and at the outlet of the flame tube. The hot combustion gases are accelerated to the speed of sound by a film-cooled turbine stator vane ring and at the same time diverted by an angle of approx. 70° in the rotation direction of the turbine wheel.

With the embodiments known from the state of the art, it has proven disadvantageous that an expensive combustion chamber design having a high weight is required. Furthermore, the stator vane system of the centrifugal compressor (radial compressor stator vane system) is very complex and expensive in respect of its flow guidance and flow optimization.

A further disadvantage of the designs known from the state of the art is that overall a flow diversion through the combustion chamber of approx. 300° is required. The result of this is additional flow losses, which in turn lead to increased engine consumption and increased pollutant emissions.

The object underlying the present invention is to provide a gas-turbine combustion chamber arrangement of the type specified at the beginning which, while being simply and axially shorter designed and easily and cost-effectively producible, avoids the disadvantages of the state of the art and features a high efficiency.

It is a particular object of the present invention to provide solution to the above problems by the features described herein. Further advantageous embodiments of the present invention will be apparent from the present description.

In accordance with the invention, it is thus provided that a stator vane arrangement is provided between the centrifugal compressor and the annular combustion chamber, and is designed such that the air flowing out of the centrifugal compressor is diverted at an angle between 20° and 30°, preferably 25°, relative to the engine axis. The airflow is then passed at this angle to the combustion chamber. In accordance with the invention, it is furthermore provided that the inflow area into the combustion chamber is designed such that the air is guided at an angle between 30° and 40°, preferably 35°, relative to the engine axis.

To achieve optimum combustion and an optimum flame curve, the center axes of the burners of the combustion chamber are inclined in accordance with the invention at an angle between 30° and 40°, preferably 35°, relative to a meridional plane through which the engine axis passes.

According to the invention, the stator vane system downstream of the radial compressor rotor wheel (centrifugal compressor rotor wheel) thus diverts the flow not completely in the axial direction, as known from the state of the art, but only up to a residual swirl angle of between 20° and 30°, preferably 25°. The airflow thus has a considerable residual swirl angle before the flow surge to the combustion chamber.

In accordance with the invention, the flow surge to the flame tube is effected with this swirl, with the flow being directed radially inwards. As it does so, the flow swirl rises to 30° to 40°, preferably 35°, in accordance with the invention, at a radial position of the flame tube dome.

As already mentioned, in accordance with the invention the injection nozzles and the heat shields are rotated accordingly inside the flame tube dome, i.e. arranged inclined.

The flames thus form downstream of the burners with an initial swirl which is between 30° and 40°, preferably 35°, with the flames following a spatial curve with a rising swirl of between 50° and 60°, preferably 55°, in the axial outlet of the flame tube. This area is at the same time the inlet area to a turbine stator vane ring. The flames therefore form in accordance with the invention in a spatial curve and not, as in the state of the art, in a meridional plane.

In accordance with the invention, it is thus particularly favourable that the annular combustion chamber is designed to form a helical flame in the centripetal flame tube.

Furthermore, it is particularly favourable in accordance with the invention when an array of recesses for introducing air from the centrifugal compressor is designed such that the inflowing air supports the formation of the helical flame. The array of recesses (side wall perforation into the flame tube) thus supplies a secondary flow to be mixed in the flame tube, which flow is adapted and optimized to form the helical flame array.

In accordance with the invention, the actual flow diversion in the combustion space or in the area of the centripetal annular combustion chamber is thus only approx. 175°, compared with the 300° known from the state of the art. One of the results of this is an intensification of combustion, flame formation and flame mixing ratios.

The combustion chamber in accordance with the invention thus forms a helical flame and can be manufactured more easily and in more compact form for comparable flame tube volumes than is the case with conventional centripetal annular combustion chambers.

Furthermore, it has proven advantageous that the embodiment in accordance with the invention can have, downstream of the radial compressor rotor wheel (centrifugal compressor rotor wheel), a simplified stator vane system, which has a residual swirl of preferably 25° at the outlet. This too leads to a simpler, more space-saving and less expensive design compared to the state of the art and results in a lower overall weight.

The formation of the helical flame in accordance with the invention is favoured by the swirl-adjusted injection nozzles in the flame tube dome and by a staged heat shield to ensure the swirl flame.

In accordance with the invention, only around half the number of stator vanes are needed, when compared with a centripetal annular combustion chamber according to the state of the art, at the outlet of the annular combustion chamber with the centripetal and helical flame array in accordance with the invention in the turbine stator vane ring. Also, these stator vanes are designed such that a lesser diversion of the flow is required. This lesser diversion is only approx. 25% of the diversion according to the combustion chamber designs known from the state of the art. The stator vanes provided in accordance with the invention are preferably film-cooled and integrated into a distinctly convergent annular nozzle. This ensures acceleration of the combustion gases up to the speed of sound. The less-diverting stator vanes in accordance with the invention advantageously adjust the flow direction at the combustion chamber outlet to the flow direction inside the following turbine wheel.

To achieve the flow residual swirl in accordance with the invention of approx. 25° at the compressor outlet/combustion chamber inlet, it is possible in accordance with the invention either to reduce the number of necessary stator vane grids, preferably to only two stator vane grids, and to use a vane-free manifold diffuser rated for a residual swirl of preferably 25°, or alternatively to this to use in accordance with the invention all three stator vane grids known from the state of the art, the latter being modified such that each stator vane grid is rated for a lesser diversion, since the already described residual swirl of preferably 25° is to be achieved at the outlet. This places less stress on the stator vane grids, leading to a drop in the pressure losses in the stator vane system of the compressor.

The present invention is described in the following in light of the accompanying drawing, showing exemplary embodiments. In the drawing.

Figure 1:
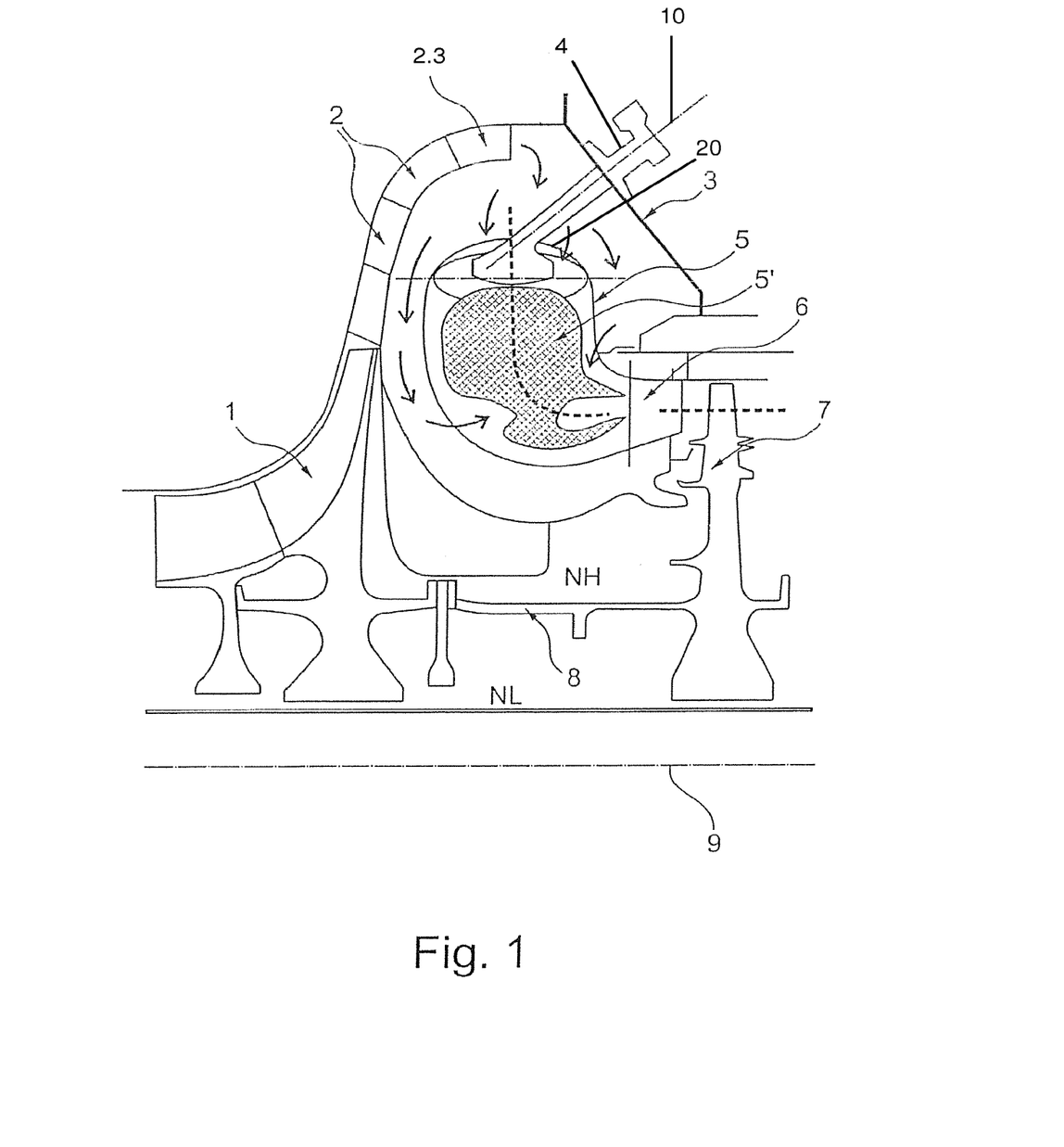
FIG. 1 shows a schematic partial axial sectional view of an exemplary embodiment of a gas-turbine combustion chamber arrangement in accordance with the present invention.

FIG. 1 shows a centrifugal compressor rotor wheel 1 (radial compressor rotor wheel) designed as such in accordance with the state of the art. This wheel rotates about an engine axis 9. Furthermore, FIG. 1 shows in schematic representation a high-pressure turbine 7 as well as a high-pressure turbine shaft 8.

The flow exiting the centrifugal compressor rotor wheel 1 flows in accordance with the invention through a stator vane system (outlet guide vanes (OGV) 2). Inside the stator vane system 2 the flow is diverted, as described in the following, in the manner in accordance with the invention.

Furthermore, FIG. 1 shows a combustion chamber casing 3 in which injection nozzles 4 are arranged. A centripetal flame tube 5 is assigned to this casing. A helical flame 5' forms inside the centripetal flame tube 5, as is shown in FIG. 1. At the outflow area of the centripetal flame tube 5, a stator vane arrangement 6 is provided, by which the combustion gases are aligned in their flow direction and passed to the high-pressure turbine 7. The flow arrows in FIG. 1 show the flow into flame tube 5 through recesses 20, and through and around the flame tube 5, which is perforated. In FIG. 1 the swirl is not visible.

Figure 2:
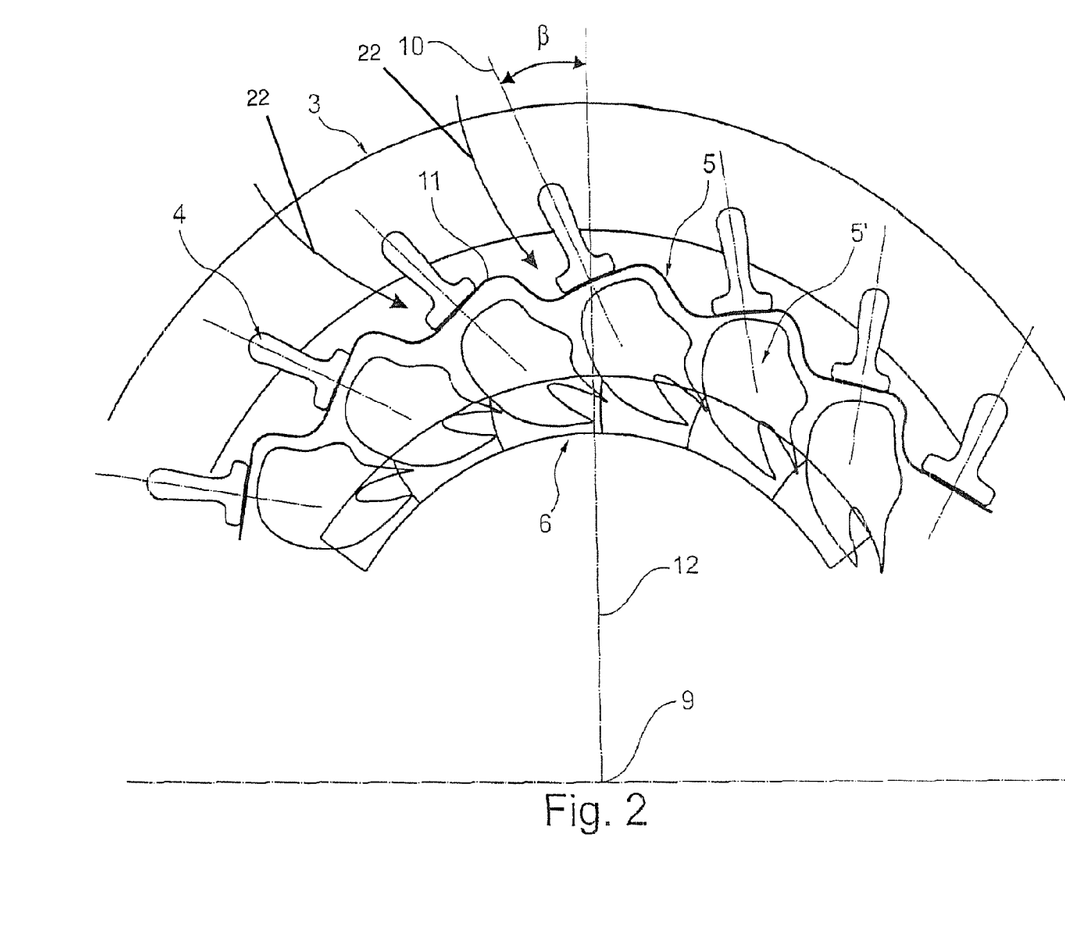
FIG. 2 shows a sectional view of the arrangement in accordance with FIG. 1 in a radial sectional plane.

FIG. 2 shows a radial sectional view by analogy with FIG. 1. Here, a meridional plane 12 is shown, relative to which the center axes 10 of the injection nozzles 4 are inclined. As further shown in FIG. 2, the heat shields 11 of the centripetal flame tube 5 (dome of the centripetal flame tube) are also inclined by this angle β. The flow arrows 22 show the flow and initial swirl angle at an angle of approx. 35° relative to the meridional plane 12 passing through the engine axis 9. The swirl is preserved here (r·cu=constant), but not the swirl angle (r=radius, cu=velocity component).

Figures 3, 4:
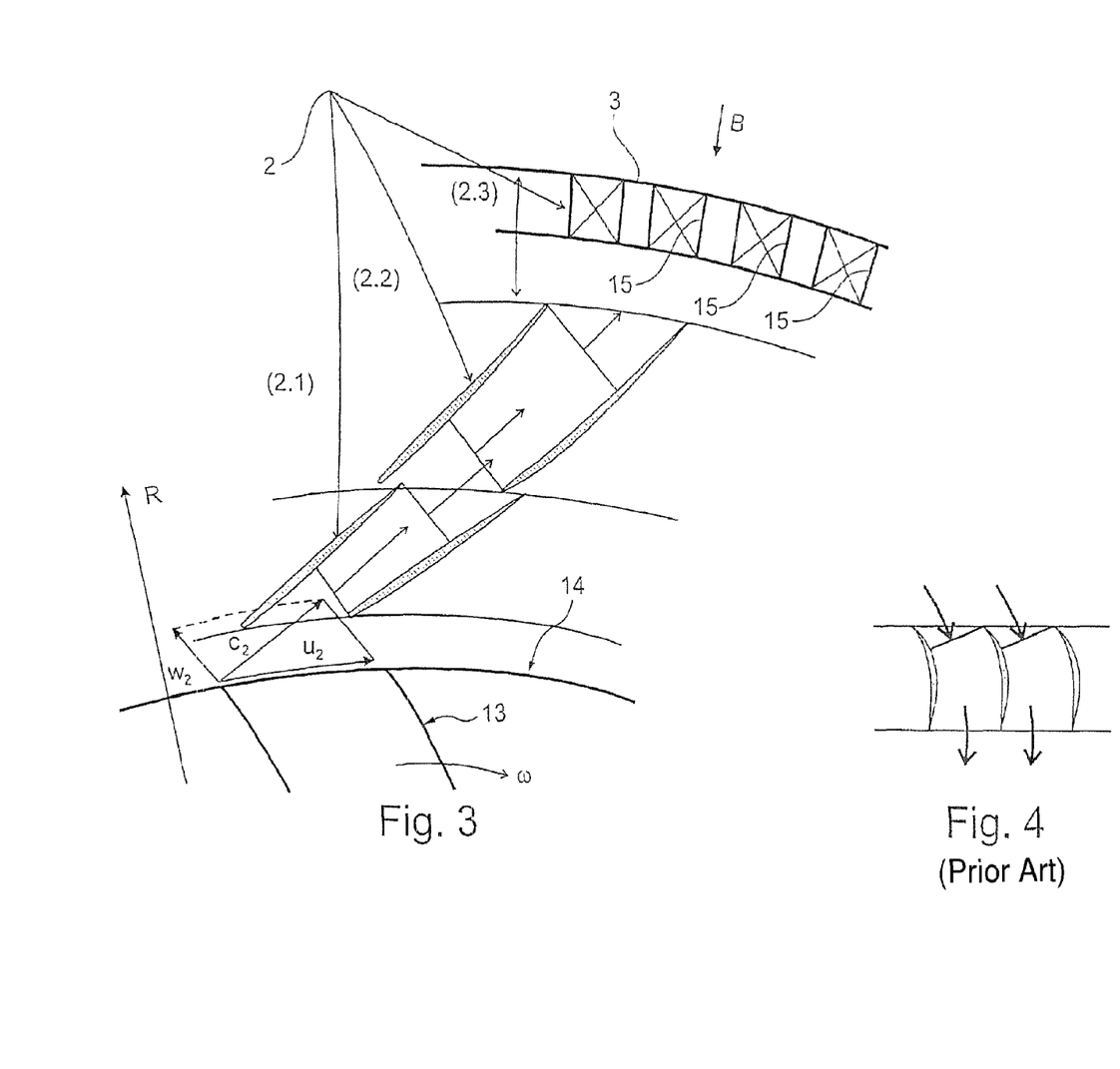
FIG. 3 shows a simplified representation of the stator vane system in accordance with the invention in an illustration by analogy with FIGS. 1 and 2.
FIG. 4 shows a view in the direction B in accordance with FIG. 3 (state of the art)

FIG. 3 shows in a simplified view the flow guidance and flow diversion according to the invention. The reference numeral 13 shows a rotor blade of the centrifugal compressor 1. The reference numeral 14 indicates an outlet radius of the centrifugal compressor rotor wheel. The radial direction is shown by arrow R, and the rotation direction by the arrow ω. Furthermore, FIG. 3 shows the division of the flow components. The reference numerals 2.1, 2.2 and 2.3 indicate the individual stator vane systems (stator vane grids) by which the above-described flow diversion in accordance with the invention is effected. The flow reaches, by analogy with the representation in FIGS. 1 and 2, the combustion chamber casing 3 and hence an area of the vane-free manifold.

FIG. 4 shows a view in the direction of the arrow B, from which a view onto the axial stator vane grid 2.3 is obtained with a flow according to the state of the art ($\alpha=0°$).

Figure 5:
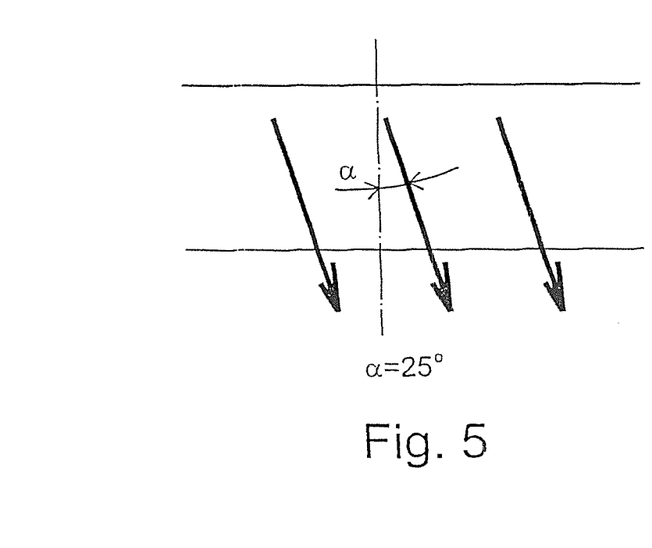
FIG. 5 shows a detail view of a development of the cylinder section through the manifold area of the stator vane system in vane-free representation.
Figure 6:
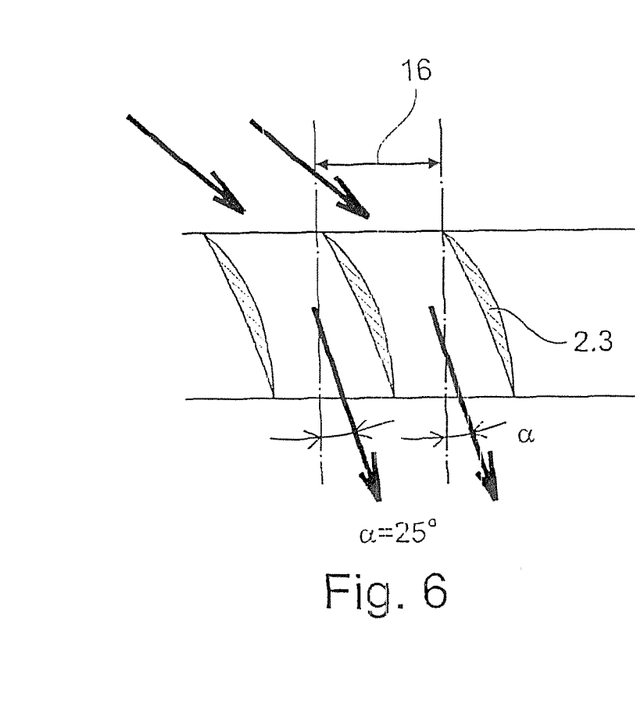
FIG. 6 shows a view, by analogy with FIG. 5, with additional stator vanes.

FIGS. 5 and 6 show two design variants in a developed view of the cylinder section through the manifold area for receiving the stator vane grid 2.3 of the stator vane system 2. FIG. 5 shows a variant which is designed vane-free and forms the residual swirl in accordance with the invention with an angle of $\alpha=25°$. FIG. 6 shows the vanes of the stator vane grid 2.3, which have a pitch 16 and are designed to provide the residual swirl angle $\alpha$ of 25°.

Figure 7:
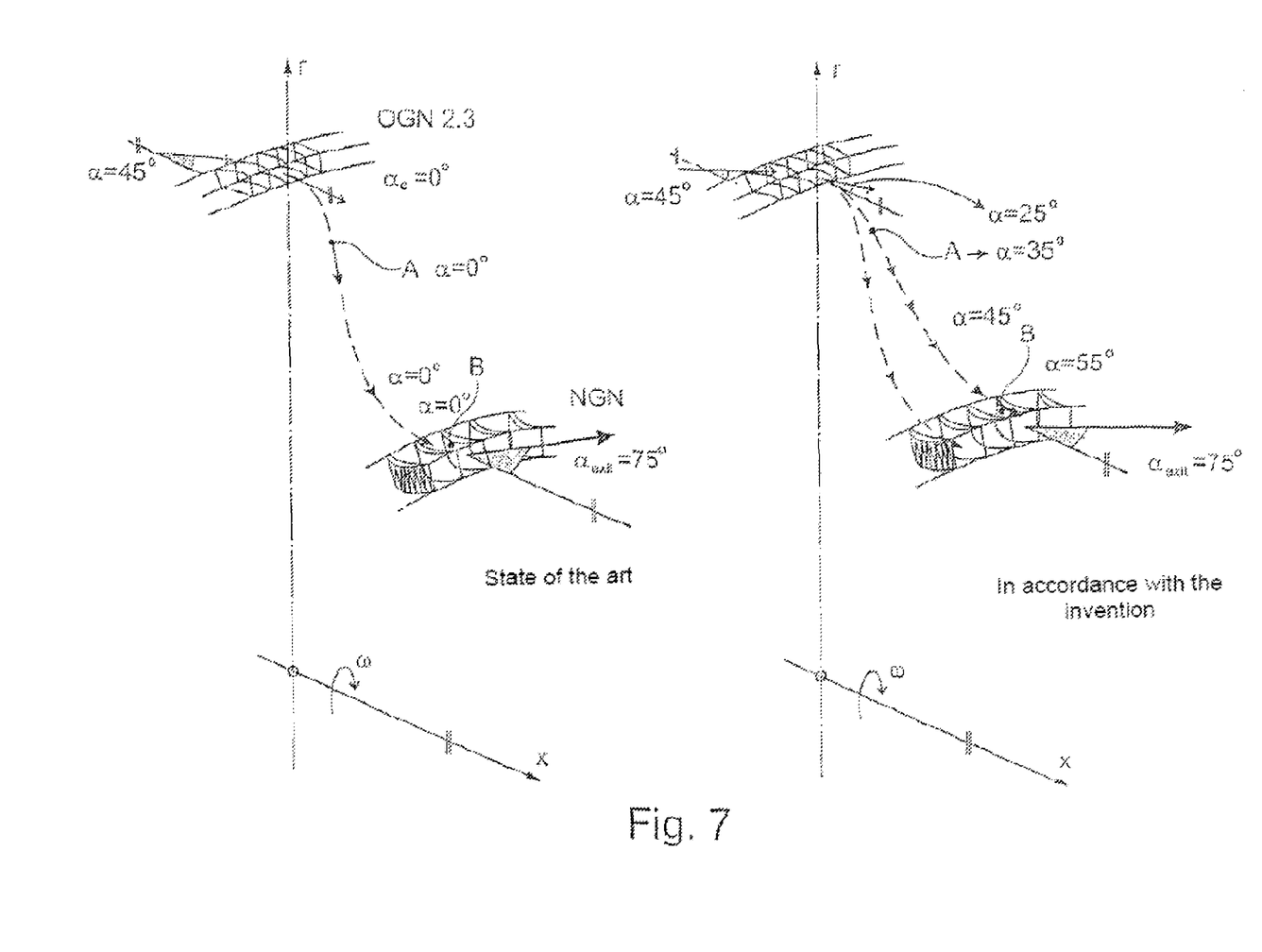
FIG. 7 shows a comparative representation between the flow guidance in accordance with the invention and the flow guidance in accordance with the state of the art.

FIG. 7 shows a comparison between the throughflow in accordance with the invention and the throughflow known from the state of the art. The left-hand half of FIG. 7 here shows the throughflow according to the state of the art, while the right-hand half of the figure shows the throughflow in accordance with the invention.

The upper part of the left-hand half of FIG. 7 shows schematically the outlet guide vanes (OGV) 2.3. The flow is passed into these in accordance with the state of the art at an angle of $\alpha=45°$ and is diverted to an outlet angle $\alpha_e=0°$.

By way of comparison, the right-hand upper half of FIG. 7 shows the flow guidance in accordance with the invention. Here too, the flow passes at an angle of $\alpha=45°$ into the outlet guide vanes (OGV) 2.3. The flow is however not diverted to an angle of α=0°, but leaves the outlet guide vanes at an angle of α=25°.

In the flow course shown below in FIG. 7, it can be seen that in the state of the art, at a position A of the burner on the heat shield, the flow has an angle of α=0°. By way of comparison, the right-hand half of FIG. 7 shows that in accordance with the invention the flow at position A has an angle of α=35° (preservation of swirl).

The illustration of the flow course in accordance with the state of the art (left-hand half of FIG. 7) shows that the flow is then guided at an angle of α=0° and is passed at a position B with this angle of α=0° to the stator vanes of the high-pressure turbine (nozzle guide vanes, NGV). When it leaves the NGVs, the flow has swirl angle $\alpha_{exit}$ of 75°.

In contrast to this, the right-hand half of FIG. 7 shows the flow course in accordance with the invention. After exiting the outlet guide vanes 2.3 with an angle of α=25°, the result at position A is an angle of α=35°. This angle increases during further flow to α=45°, so that at the position B an angle of α=55° applies. The outlet angle $\alpha_{exit}$ is then 75°. The right-hand half of FIG. 7 also shows by comparison the flow course according to the state of the art, shown in the left-hand half of FIG. 7. From the comparison of the two flow courses in the right-hand half of FIG. 7, the flow guidance in accordance with the invention is obtained. In the flame tube space, the flow is thus guided with a swirl flow at an increasing angle α while the radius r decreases in order to preserve the swirl.

In accordance with the invention, the design of the flame tube is, as already explained, adapted spatially between position A (position of burner on the heat shield) and position B (stator vane of high-pressure turbine, NGV) such that combustion and mixing are optimized. This is achieved, among others, by appropriate adjusting the heat shields, by suitable perforation and by suitable selection of the width of the flow paths. This can be clearly seen from the comparison of the two flow courses in FIG. 7, in particular in comparison to the flow guidance shown in the left-hand half of FIG. 7 with a flame tube space with inward-directed flow in a meridional plane (α=0°).

LIST OF REFERENCE NUMERALS

1 Centrifugal compressor rotor wheel
2 Outlet guide vane (OGV) past the centrifugal compressor rotor wheel (stator vane arrangement, stator vane system)
3 Combustion chamber casing
4 Injection nozzle/burner
5 Centripetal flame tube/dome of centripetal flame tube
5' Helical flame/flame
6 Guide vane (NGV) to turbine/turbine stator vane ring
7 High-pressure turbine
8 High-pressure turbine shaft
9 Engine axis
10 Center axis of injection nozzle
11 Heat shield
12 Meridional plane
13 Rotor blade of centrifugal compressor 1
14 Centrifugal compressor outlet radius
15 Trailing edge of stator vane grid 2.3 of the stator vane system 2
16 Pitch

What is claimed is:

1. A gas-turbine combustion chamber arrangement in a gas-turbine comprising;
   a centrifugal compressor;
   a centripetal annular combustion chamber,
   a centripetal flame tube positioned in the centripetal annular combustion chamber;
   a plurality of burners positioned in the centripetal annular combustion chamber, and
   a stator vane arrangement provided between the centrifugal compressor and the centripetal annular combustion chamber, the centrifugal compressor configured to provide an inflow to the stator vane arrangement at an angle in a range approximately from 40° to 50° relative to a meridional plane including an engine axis,
   wherein the stator vane arrangement for diverting air flowing out of the centrifugal compressor is arranged to reverse the inflow to an angle (α) of 20° to 30°, relative to the meridional plane, to pass the air flowing out of the centrifugal compressor at the angle (α) to the centripetal annular combustion chamber,
   wherein an inflow area into the centripetal annular combustion chamber for supplying air is arranged at an angle of 20° to 30°, relative to the meridional plane, and
   at least one chosen from center axes of the plurality of burners and injection nozzles of the centripetal annular combustion chamber are arranged inclined at an angle (β) of 30° to 40°, relative to the meridional plane.

2. The gas-turbine combustion chamber arrangement in accordance with claim 1, wherein heat shields of the plurality of burners are arranged inclined at the angle (β) of 30° to 40°, relative to the meridional plane.

3. The gas-turbine combustion chamber arrangement in accordance with claim 1, wherein the plurality of burners are constructed and arranged to apply an initial swirl onto flames of the plurality of burners, which is at an angle of between 30° and 40°, relative to the meridional plane.

4. The gas-turbine combustion chamber arrangement in accordance with claim 3, wherein the plurality of burners are constructed and arranged for generating a swirl flow onto flames of the plurality of burners in an axial outlet of the centripetal flame tube at an inlet area to a turbine stator vane ring of an angle of 50° to 60°, relative to the meridional plane.

5. The gas-turbine combustion chamber arrangement in accordance with claim 1, wherein the centripetal annular combustion chamber is constructed and arranged to form a helical flame in the centripetal flame tube.

6. The gas-turbine combustion chamber arrangement in accordance with claim 1, and further comprising an array of recesses for introducing air from the centrifugal compressor for forming a helical flame in the centripetal flame tube.

7. The gas-turbine combustion chamber arrangement in accordance with claim 1,
   wherein the stator vane arrangement for diverting air flowing out of the centrifugal compressor is arranged at the angle (α) of 25°, relative to the engine axis, to pass the air flowing out of the centrifugal compressor at the angle (α) to the centripetal annular combustion chamber,
   wherein the inflow area into the centripetal annular combustion chamber for supplying air is arranged at an angle of 25°, relative to the meridional plane, and
   at least one chosen from center axes of the plurality of burners and the injection nozzles of the centripetal annular combustion chamber are arranged inclined at the angle (β) of 35°, relative to the meridional plane.

8. The gas-turbine combustion chamber arrangement in accordance with claim 2, wherein at least one chosen from the heat shields of the plurality of burners and the injection nozzles are arranged inclined at the angle (β) of 35°, relative to the meridional plane.

9. The gas-turbine combustion chamber arrangement in accordance with claim 3, wherein the plurality of burners are constructed and arranged to apply an initial swirl onto flames of the plurality of burners, which is set at 35°, relative to the meridional plane.

10. The gas-turbine combustion chamber arrangement in accordance with claim 4, wherein the plurality of burners are constructed and arranged for generating a swirl flow onto flames of the plurality of burners in an axial outlet of the centripetal flame tube at an inlet area to a turbine stator vane ring of 55°, relative to the meridional plane.

11. A method for flow guidance in a centrifugal compressor and a centripetal annular combustion chamber of a gas-turbine, comprising:
   aligning a flow exiting the centrifugal compressor at an angle in a range approximately from 40° to 50°, relative to a meridional plane including an engine axis,
   reversing the flow exiting the centrifugal compressor to an angle (a) of 20° to 30°, relative to the meridional plane and supplying the flow to the centripetal annular combustion chamber at the angle ($\alpha$),
   aligning the flow in an inflow area into the centripetal annular combustion chamber at an angle of 30° to 40°, relative to the meridional plane, and
   aligning the flow exiting the centripetal annular combustion chamber at an angle of 50° to 60°, relative to the meridional plane.

12. The method in accordance with claim 11, and further comprising:
   aligning the flow exiting the centrifugal compressor at the angle ($\alpha$) of 25°,
   aligning the flow in the inflow area into the centripetal annular combustion chamber at an angle of 35°, relative to the meridional plane, and
   aligning the flow exiting the centripetal annular combustion chamber at an angle of 55°, relative to the meridional plane.

* * * * *